United States Patent
Lucas (12) United States Patent (10) Patent No.: US 12,006,377 B2
(45) Date of Patent: Jun. 11, 2024

(54) SYSTEM AND METHOD FOR STARCH SEPARATION AND DRY FRACTURING WITH FIBER WASH

(71) Applicant: LucasE3, L.C., Shawnee, KS (US)

(72) Inventor: Scott A Lucas, De Soto, KS (US)

(73) Assignee: LucasE3, L.C., Shawnee, KS (US)

( * ) Notice: Subject to any disclaimer, the term of this patent is extended or adjusted under 35 U.S.C. 154(b) by 676 days.

(21) Appl. No.: 17/170,295

(22) Filed: Feb. 8, 2021

(65) Prior Publication Data
US 2021/0246229 A1    Aug. 12, 2021

Related U.S. Application Data

(60) Provisional application No. 62/971,734, filed on Feb. 7, 2020.

(51) Int. Cl.
| | |
|---|---|
| *C08B 30/04* | (2006.01) |
| *B01D 29/11* | (2006.01) |
| *B01D 29/54* | (2006.01) |
| *B01D 35/26* | (2006.01) |
| *B01D 35/30* | (2006.01) |
| *C08B 30/10* | (2006.01) |

(52) U.S. Cl.
CPC ............ *C08B 30/044* (2013.01); *B01D 29/11* (2013.01); *B01D 29/54* (2013.01); *B01D 35/26* (2013.01); *B01D 35/306* (2013.01); *C08B 30/10* (2013.01)

(58) Field of Classification Search
CPC ....... C08B 30/044; C08B 30/10; B01D 29/11; B01D 29/54; B01D 35/26; B01D 35/306; B01D 29/31

USPC .......................................................... 127/24
See application file for complete search history.

(56) References Cited

U.S. PATENT DOCUMENTS

| | | | |
|---|---|---|---|
| 2,958,142 | A | 11/1960 | Kershaw et al. |
| 3,363,340 | A | 1/1968 | McKinley |
| 3,673,705 | A | 7/1972 | Wright et al. |
| 4,309,254 | A | 1/1982 | Dahlstrom |
| 5,178,543 | A | 1/1993 | Semans et al. |
| 5,354,203 | A | 10/1994 | Kotch et al. |
| 7,504,546 | B2 | 3/2009 | Brown et al. |
| 7,829,680 | B1 | 11/2010 | Sander et al. |
| 7,867,365 | B2 | 1/2011 | Brown |
| 7,988,580 | B2 | 8/2011 | McCrary et al. |

(Continued)

OTHER PUBLICATIONS

Katzen, et al., "Ethanol Distillation: the Fundamentals", 1999, 270-273.

(Continued)

*Primary Examiner* — Ekandra S. Miller-Cruz
(74) *Attorney, Agent, or Firm* — Law Office of Mark Brown, LLC; Mark E Brown (57) ABSTRACT

A starch separation system for an ethanol plant includes a dry fractionization system, a fiber blender, a refiner, a fiber liquefaction tank and a fiber wash system. A starch separation method includes the steps of providing a dry fractionization system receiving corn from the ethanol plant and fractionating the corn into corn oil, corn fiber, corn grits, corn, endosperm flour and germ cake. The corn components are converted to sugar and the sugar is converted to ethanol. A converted fiber stream is input to the fiber wash system for producing fiber wash water for input to the ethanol plant.

16 Claims, 5 Drawing Sheets

(56) References Cited

U.S. PATENT DOCUMENTS

| | | | |
|---|---|---|---|
| 8,123,864 B2* | 2/2012 | Christensen | C12M 45/09 44/605 |
| 8,173,412 B2 | 5/2012 | Dale | |
| 8,778,433 B2 | 7/2014 | Lee | |
| 9,012,191 B2 | 4/2015 | Lee | |
| 9,066,531 B2 | 6/2015 | Williams | |
| 9,308,489 B2 | 4/2016 | Brown et al. | |
| 9,732,302 B2 | 8/2017 | Lee | |
| 9,777,303 B2 | 10/2017 | Jaket et al. | |
| 9,931,582 B2 | 4/2018 | Furlong | |
| 9,989,310 B2 | 6/2018 | Knight, Jr. et al. | |
| 10,267,511 B2 | 4/2019 | Knight, Jr. et al. | |
| 10,315,127 B2 | 6/2019 | Mösslein et al. | |
| 10,345,043 B2 | 7/2019 | Knight, Jr. et al. | |
| 10,859,257 B2 | 12/2020 | Knight, Jr. et al. | |
| 2012/0211411 A1* | 8/2012 | Hopkins | B01D 39/1623 210/333.01 |
| 2014/0106419 A1 | 4/2014 | Bazzana et al. | |
| 2014/0238881 A1 | 8/2014 | Stuhlmann et al. | |
| 2014/0343259 A1 | 11/2014 | Bleyer et al. | |
| 2015/0041305 A1 | 2/2015 | Overheul et al. | |
| 2016/0024406 A1* | 1/2016 | Javers | C12P 7/649 435/162 |
| 2016/0279560 A1 | 9/2016 | Furlong | |
| 2017/0227287 A1 | 8/2017 | Knight, Jr. et al. | |
| 2018/0031227 A1 | 2/2018 | Knight, Jr. et al. | |
| 2018/0172349 A1 | 6/2018 | Knight, Jr. et al. | |
| 2018/0290073 A1 | 10/2018 | Brown et al. | |
| 2019/0076751 A1 | 3/2019 | Lucas | |
| 2019/0203928 A1 | 7/2019 | Knight, Jr. et al. | |
| 2019/0336882 A1 | 11/2019 | Andrade et al. | |
| 2020/0171404 A1 | 6/2020 | Lucas | |

OTHER PUBLICATIONS

Raab, "Enahnced for Ethanol", Ethanol Producer Magazine, Oct. 2019, ethanolproducer.com/articles/16511/enhanced-for-ethanol, Sep. 16, 2019, 1-2.

* cited by examiner

SYSTEM AND METHOD FOR STARCH SEPARATION AND DRY FRACTURING WITH FIBER WASH

CROSS-REFERENCE TO RELATED APPLICATION

This application claims priority in U.S. Provisional Patent Application No. 62/971,734, filed Feb. 7, 2020, which is incorporated herein by reference.

BACKGROUND OF THE INVENTION

Field of the Invention

The present invention relates generally to grain processing, and in particular to a system and method for starch separation and dry fracturing corn.

Ethanol plants are generally designed to optimize efficiency, particularly in producing higher ethanol and protein yields. Heretofore there has not been available a system and method with the advantages and features of the present invention.

SUMMARY OF THE INVENTION

A starch separation system for an ethanol plant of the present invention includes a dry fractionization system, a fiber blender, a refiner, a fiber liquefaction tank and a fiber wash system. In practicing a method of the present invention, the dry fractionization system receives corn from the ethanol plant and fractionates the corn into corn oil, corn fiber, corn grits, corn, endosperm flour and germ cake. The corn components are converted to sugar and the sugar is converted to ethanol. A converted fiber stream as input to the fiber wash system for producing fiber wash water for input to the ethanol plant.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. Said terminology will include the words specifically mentioned, derivatives thereof and words of similar meaning.

II. Preferred Embodiment

Figure 1:
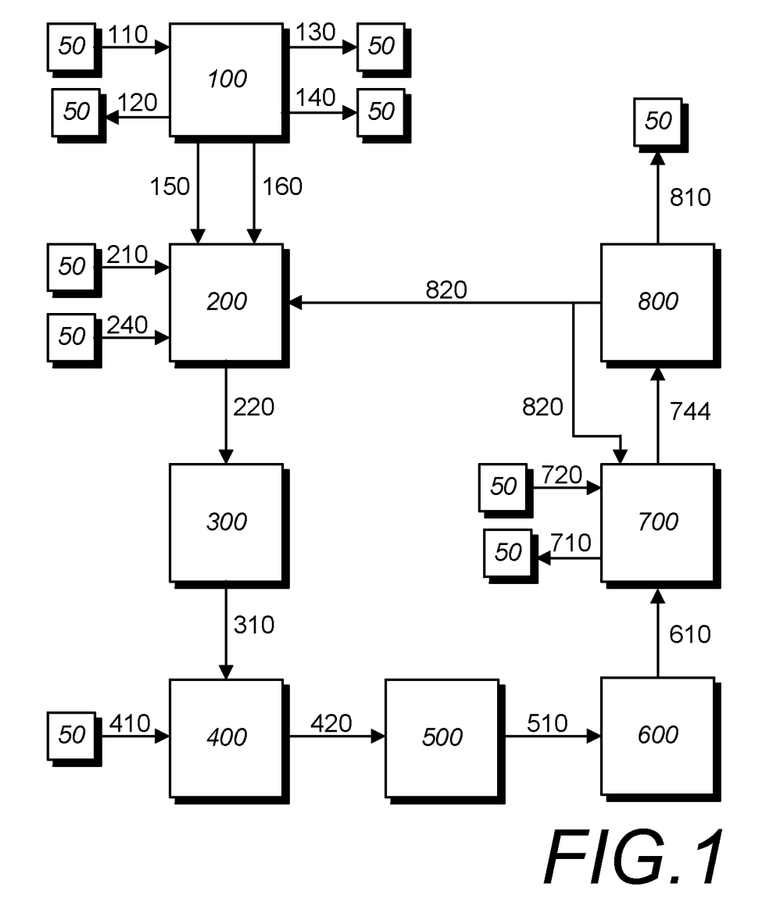
FIG. 1 is a diagram of an ethanol plant embodying an aspect of the present invention.

As shown in FIG. 1, corn 110 from an existing ethanol plant 50 is delivered to a dry fractionation system 100. In the dry fractionation system 100 the corn 110 is fractionated into five components such as corn oil 120, corn fiber 150, corn grits 140, corn endosperm flour 130 and germ cake 160.

Corn oil 120 is produced and sent to the existing plant 50 to be stored and loaded into trucks for sale as product. Corn endosperm flour 130 is also produced, and is sent to the existing plant 50 for mixing with water and conversion to sugar, which is then converted to ethanol. Corn grits 140 are produced and sent to the existing plant 50 for feeding to existing hammermills and combining with the corn endosperm flour 130 for conversion to sugar and then ethanol.

Corn fiber 150 and germ cake 160 are combined and sent to a fiber blender 200, wherein the corn fiber 150, the germ cake 160, recycled beer bottoms 240 (from the existing plant 50), an alpha amylase enzyme 210 (from the existing plant 50) and fiber centrate 820 (recycled from a later stage in the new process) are mixed to produce blended fiber 220, which is received by a fiber slurry tank 300.

From the fiber slurry tank 300 fiber slurry 310 is pumped to a steam jet 400 where steam 410 (from the existing plant 50) is thoroughly mixed with the fiber slurry 310 to produce heated fiber slurry 420. The heated fiber slurry, 420, is fed to the refiner, 500, where the heated fiber slurry, 420, is exposed to a high shear force which shreds the fiber exposing starch that has been embedded in the fiber components. Refined fiber 510, produced by the refiner 500, is received by the fiber liquefaction tank 600, where the starch contained in the fiber is converted to water soluble dextrins producing the converted fiber stream 610, which will be sent to a fiber wash system 700.

III. Fiber Wash System 700

Figure 2:
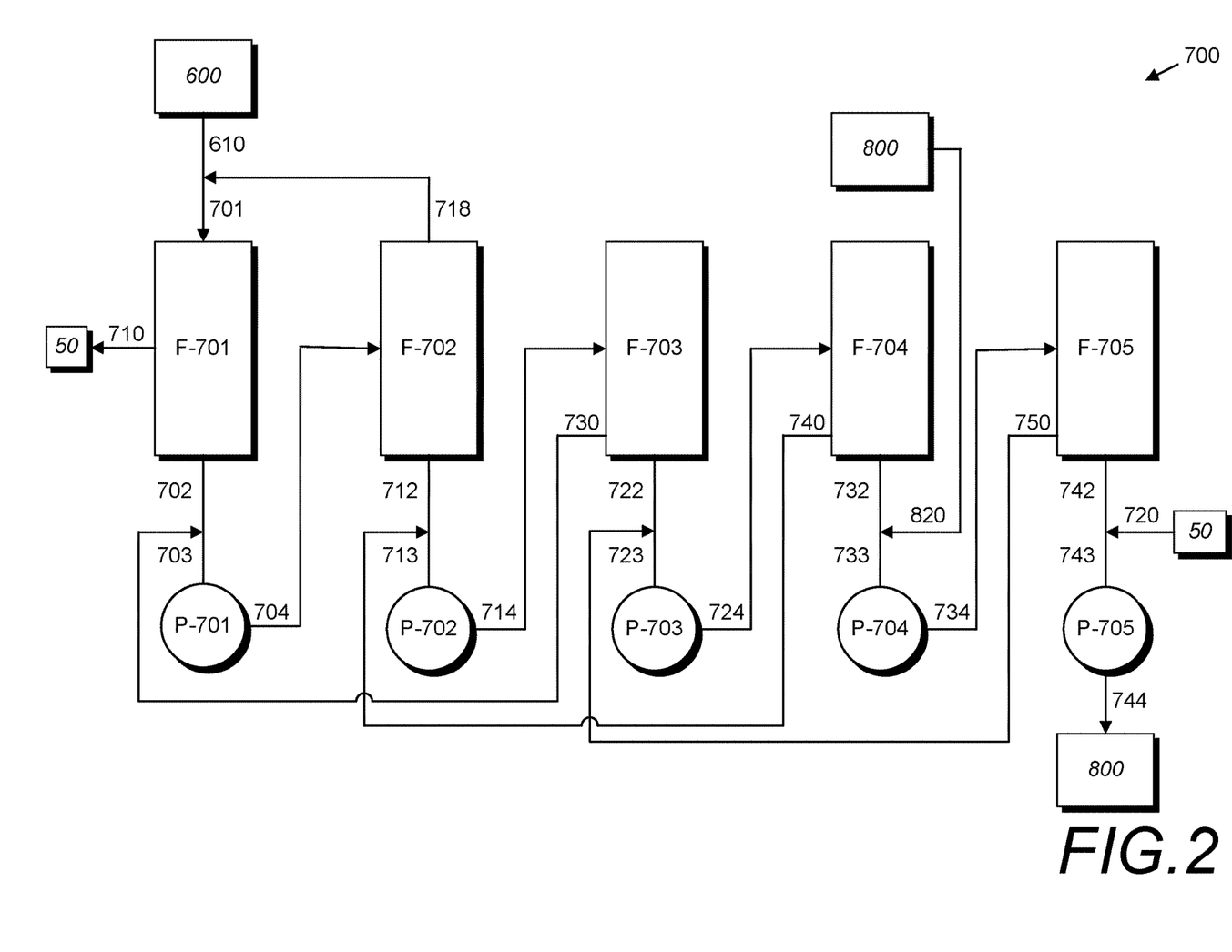
FIG. 2 is a fragmentary diagram of the system, particularly showing a fiber wash subsystem.
Figures 3, 4:
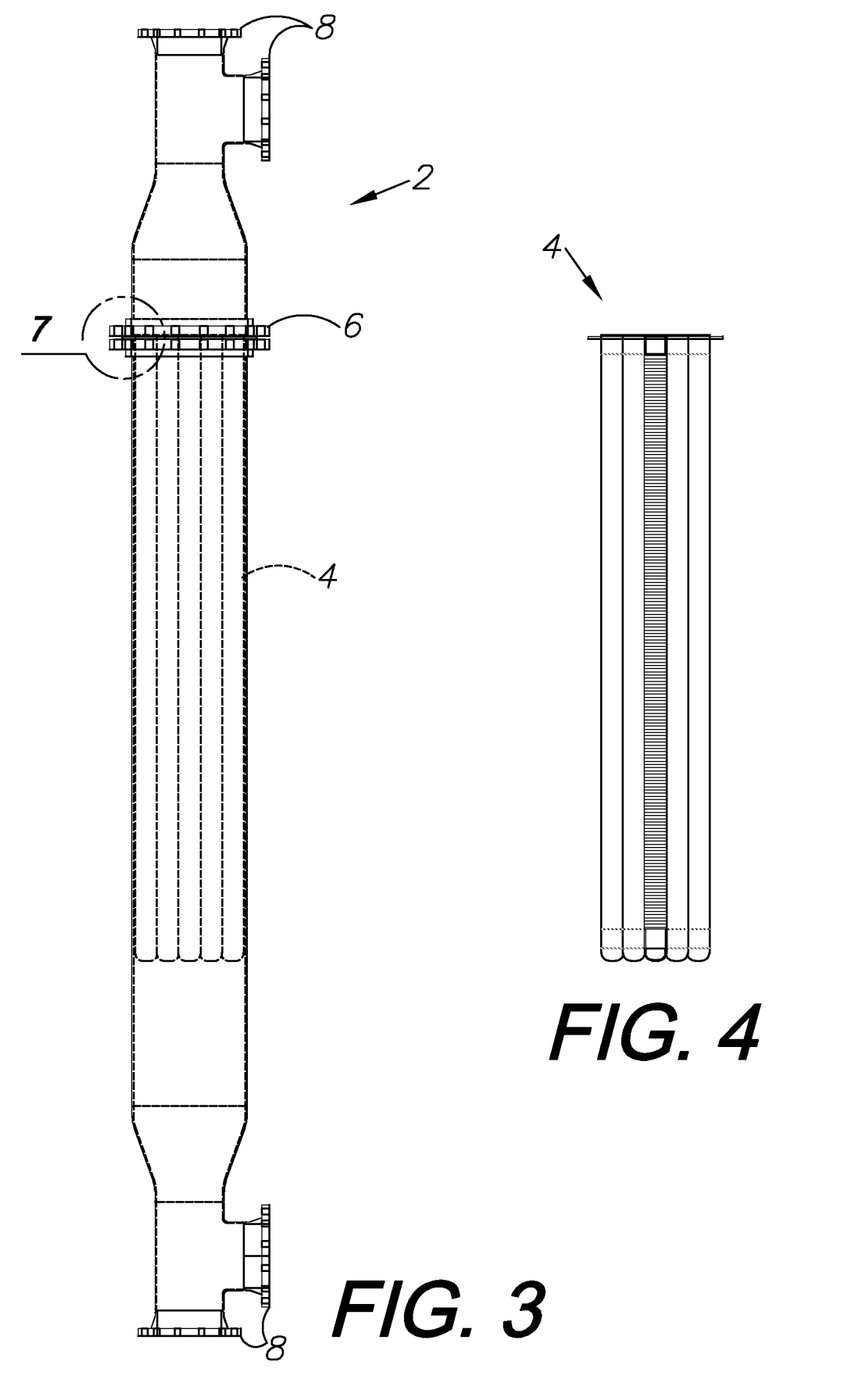
FIG. 3 is an elevation of a wash filter assembly for a fiber wash system of the present invention.
FIG. 4 is an elevation of a clean-in-place (CIP) screen cylinder assembly thereof.
Figure 5:
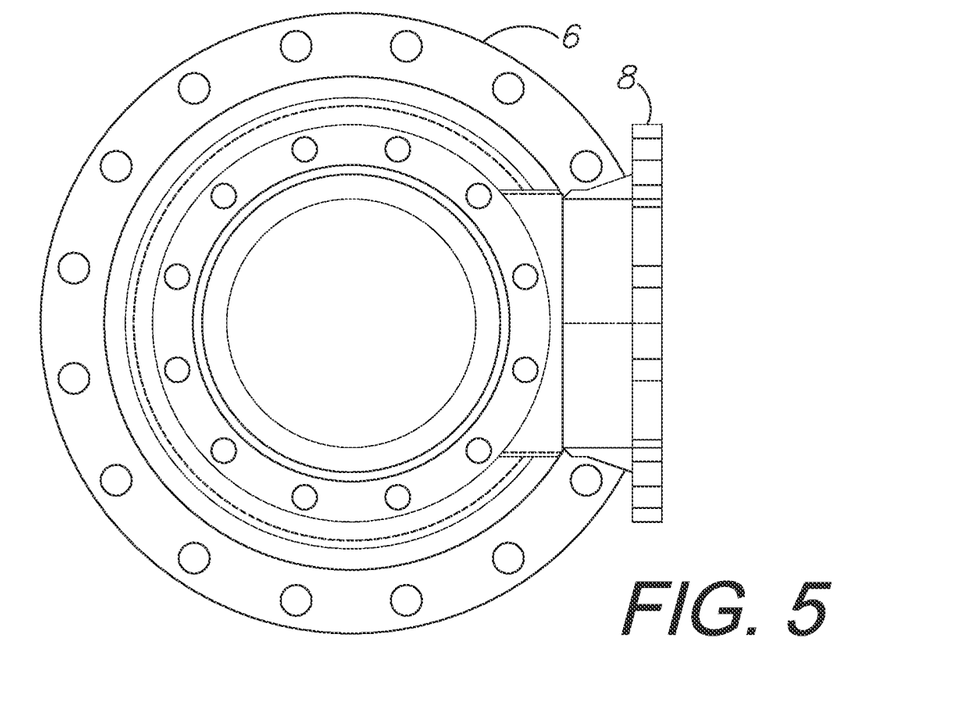
FIG. 5 is a top plan view of the wash filter assembly.
Figure 6:
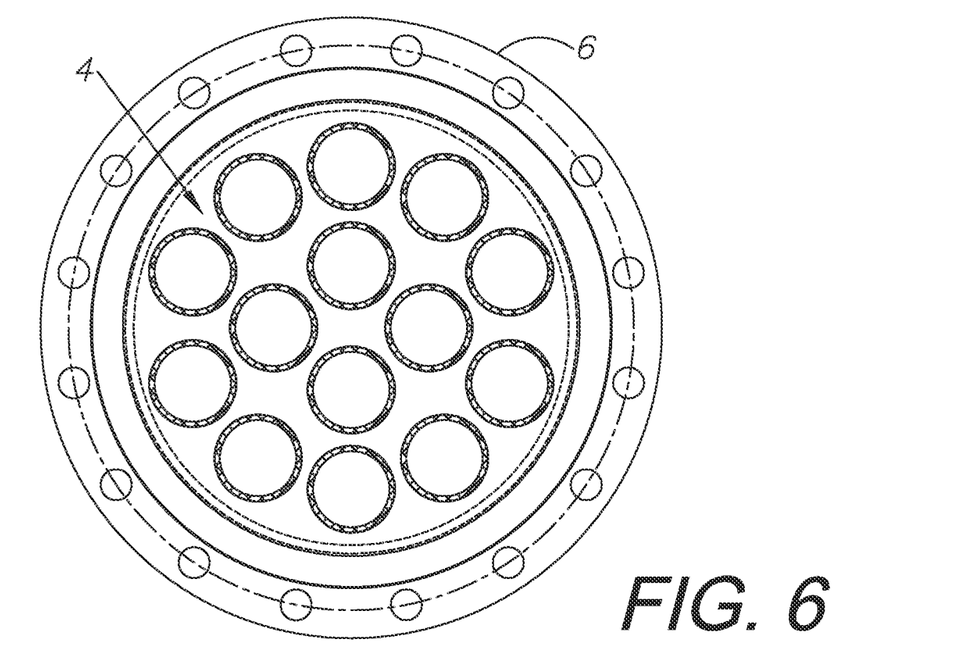
FIG. 6 is a body flange detail of the wash filter assembly.

The fiber wash system 700 is shown in greater detail in FIG. 2. The converted fiber stream 610 (from the fiber liquefaction tank 600), process water 720 (from the existing ethanol plant 50), and a portion of the fiber centrate 820 (from the fiber decanters 800) are combined and fed to the fiber wash system 700, producing fiber wash water 710 for input to the existing ethanol plant 50.

Washed fiber 744 (from the fiber wash system 700) is sent to the fiber decanters 800 where water in the form of fiber centrate 820 is removed from the washed fiber 744, producing fiber wet cake 810 at approximately 35-40% wt solids. This fiber wet cake 810 is input to the existing ethanol plant 50 for further processing. The fiber centrate 820 is recycled within the dry fractionation system 100, with portions sent to the fiber blender 200 and the fiber wash system 700.

The fiber wash system 700 washes soluble sugar and small particle size protein off of the converted fiber 610, producing the washed fiber 744 and the fiber wash water 710. The fiber centrate 820 (from the fiber decanters 800) and the process water 720 (from the existing ethanol plant 50) are used as the washing streams. The fiber wash water 710 starts with relatively clean process water 720 and fiber centrate 820, and produces sugar and protein laden fiber wash water 710 for the purpose of recovering these materials to allow for increased process efficiency, as in higher ethanol yields and higher protein yields from the existing ethanol plant 50.

The fiber wash water 710 flows through the series of filters counter current of the fiber passing through the system. The converted fiber 610 is mixed with the wash water steam 718 from a wash filter #2 (F-702) to produce a diluted feed 701 for feeding wash filter #1 (F-701).

The diluted feed 701 passes through the wash filter #1 (F-701) and to the wash pump #1 (P-701) which applies back pressure to the diluted feed 701. This back pressure will force filtered wash water 710 through the filter element, exiting from the body of Wash Filter #1 (F-701).

The slightly dewatered fiber stream, 702, at approximately 3-6% wt solids will pass out of the bottom of Wash Filter #1, F-701, to Wash Pump #1, P-701. Before the fiber stream, 702, reaches Wash Pump #1, P-701, the fiber stream will be diluted by mixing with wash water stream, 730, from Wash Filter #3, F-703, to produce a diluted fiber stream, 703, that is transferred to Wash Filter #2, F-702 using Wash Pump #1, P-701, as a diluted feed 704.

The diluted feed, 704, will pass through Wash Filter #2, F-702, and to Wash Pump #2, P-702, which will be operated such that there is back pressure applied to diluted feed, 704. This back pressure will force filtered wash water, 718, through the filter element, exiting from the body of Wash Filter #2, F-702.

The slightly dewatered fiber stream, 712, at approximately 3-6% wt solids will pass out of the bottom of Wash Filter #2, F-702, to Wash Pump #2, P-702. Before the fiber stream, 712, reaches Wash Pump #2, P-702, the fiber stream will be diluted by mixing with wash water stream, 740, from Wash Filter #4, F-704, to produce a diluted fiber stream, 713, that is transferred to Wash Filter #3, F-703 using Wash Pump #2, P-702, as a diluted feed 714.

The diluted feed, 714, will pass through Wash Filter #3, F-703, and to Wash Pump #3, P-703, which will be operated such that there is back pressure applied to diluted feed, 714. This back pressure will force filtered wash water, 730, through the filter element, exiting from the body of Wash Filter #3, F-703.

The slightly dewatered fiber stream, 722, at approximately 3-6% wt solids will pass out of the bottom of Wash Filter #3, F-703, to Wash Pump #3, P-703. Before the fiber stream, 722, reaches Wash Pump #3, P-703, the fiber stream will be diluted by mixing with wash water stream, 750, from Wash Filter #5, F-705, to produce a diluted fiber stream, 723, that is transferred to Wash Filter #4, F-704 using Wash Pump #3, P-703, as a diluted feed 724.

The diluted feed, 724, will pass through Wash Filter #4, F-704, and to Wash Pump #4, P-704, which will be operated such that there is back pressure applied to diluted feed, 724. This back pressure will force filtered wash water, 740, through the filter element, exiting from the body of Wash Filter #4, F-704.

The slightly dewatered fiber stream, 732, at approximately 3-6% wt solids will pass out of the bottom of Wash Filter #4, F-704, to Wash Pump #4, P-704. Before the fiber stream, 732, reaches Wash Pump #4, P-704, the fiber stream will be diluted by mixing with Fiber Centrate, 820, from the Fiber Decanters, 800, to produce a diluted fiber stream, 733, that is transferred to Wash Filter #5, F-705 using Wash Pump #4, P-704, as a diluted feed 734.

The diluted feed, 734, will pass through Wash Filter #5, F-705, and to Wash Pump #5, P-705, which will be operated such that there is back pressure applied to diluted feed, 734. This back pressure will force filtered wash water, 750, through the filter element, exiting from the body of Wash Filter #5, F-705.

The slightly dewatered fiber stream, 742, at approximately 3-6% wt solids will pass out of the bottom of wash filter #5 (F-705) to wash pump #5, p-705. Before the fiber stream 742 reaches wash pump #5, p-705, the fiber stream will be diluted by mixing with process water, 720, from the existing ethanol plant, 50, to produce a diluted fiber stream, 743, that is transferred to the fiber decanters, 800, using wash pump #5 (P-705) as a diluted feed 744. The diluted feed 744 is input to the fiber decanters, 800.

Figure 7:
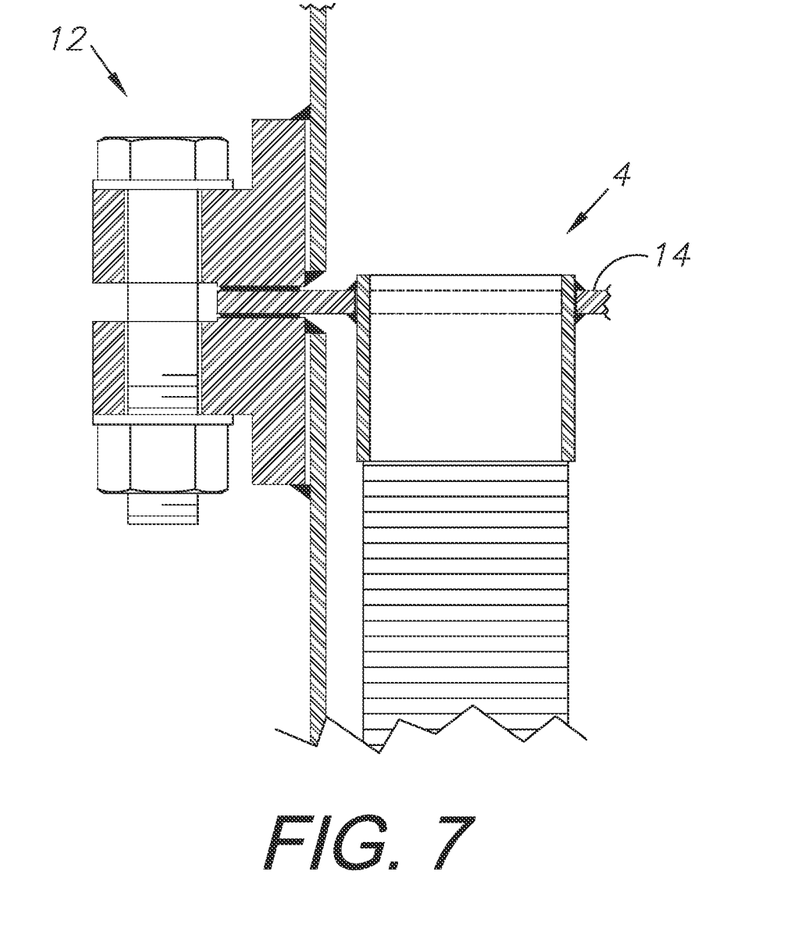
FIG. 7 is a wash filter body flange detail, taken generally within circle 7 in FIG. 3.

FIGS. 3-7 show the construction of an example of wash filter construction. Other wash filters and wash filter system configurations can be used with the present invention. Each of the fiber wash filters #1-#5 consists of a wash filter assembly 2 including multiple (e.g., 14 are shown) internal screen cylinder assemblies 4. The wash filter assembly 2 includes body and weld neck flanges 6, 8 respectively. FIG. 7 shows a wash filter clamp 12 for mounting a tube sheet 14, which is mounted at the upper ends of the screen cylinder assemblies 4.

The screen cylinder assemblies 4 include wedge wire screens and are installed as a bundle inside the wash filter assembly 2. Without limitation, the wedge wire screens can have 40 μm (micron) openings. The wedge wires have flat sides, which are located at the outer surfaces of respective screen cylinders 4. A body flange 6 is provided for mounting the wash filter assembly. Weld neck flanges 8 provide connections for inputs to and outputs from the wash filter assembly 2.

IV. Conclusion

It is to be understood that the invention can be embodied in various forms and is not to be limited to the examples specifically discussed above. The range of components and configurations which can be utilized in the practice of the present invention is virtually unlimited.

Having thus described the invention, what is claimed as new and desired to be secured by Letters Patent is:

1. A starch separation system for an ethanol plant, which system comprises: a dry fractionization system configured for receiving corn from the ethanol plant and fractionating the corn into components including corn oil, corn fiber, corn grits, corn, endosperm flour and germ cake; said ethanol plant configured for mixing said corn endosperm flour with water for conversion to sugar; said ethanol plant configured for feeding said corn grits to a hammer mill and combining with said corn endosperm flour for conversion to sugar; said ethanol plant configured for converting said sugar to ethanol; a fiber blender configured for combining said corn fiber and said germ cake with recycled beer bottoms from the ethanol plant, and an amylase enzyme from the ethanol plant and a fiber center to produce a blended fiber; a fiber slurry tank configured for receiving said blended fiber; a steam jet configured for receiving fiber slurry from the fiber slurry tank for mixing with steam to produce heated fiber slurry; a refiner configured for receiving said heated fiber slurry and exposing the heated fiber slurry to a high shear force for shredding fiber and exposing starch embedded in the fiber components; said refiner configured for producing refined fiber; a fiber liquefaction tank configured for receiving said refined fiber and converting starch contained therein to water-soluble dextrins for producing a converted fiber stream; and a fiber wash system configured for receiving said converted fiber stream and producing fiber wash water for input to the ethanol plant; wherein said fiber wash system includes: multiple filters; and said starch separation system being configured for flowing said fiber wash water counter current of fiber passing through said fiber wash system; said fiber wash filter including a wash filter body comprising a pipe with sealed upper and lower ends; a fiber wash inlet; a process water inlet; and a fiber wash water outlet configured for providing fiber wash water to said ethanol plant; each said fiber wash filter including: a screen cylinder assembly comprising multiple screen cylinders installed as a bundle in said wash filter body; each said screen cylinder assembly including a cylindrical wedge wire screen comprising multiple wedge wires and including an outer surface; each said wedge wire having a flat side at said outer surface; and multiple wash pumps each configured for receiving a dewatered fiber stream from a respective wash filter, diluting same with process water, and transferring a diluted fiber stream to a respective wash filter.

2. The starch separation system of claim 1, which includes: said fiber wash system including fiber decanters configured for providing fiber centrate for combining with said fiber wash water.

3. The starch separation system of claim 1, which includes: said fiber decanters configured for producing fiber wet cake at approximately 35-40% wt solids for input to the ethanol plant for further processing.

4. The starch separation system of claim 3, wherein said fiber decanters is configured for recycling said fiber centrate and sending portions to the fiber blender and the fiber wash system.

5. The starch separation system of claim 1 wherein said fiber wash system washes soluble sugar and small particle size protein off of the converted fiber stream for producing washed fiber and fiber wash water.

6. The starch separation system of claim 5 wherein: said fiber wash water is laden with sugar and protein; and said starch separation system is configured for recovering said sugar and protein for increased process efficiency.

7. The starch separation system of claim 1 wherein said fiber wash system includes: multiple filters; and said starch separation system being configured for flowing said fiber wash water counter current of fiber passing through said fiber wash system.

8. The starch separation system of claim 2, which includes: said starch separation system configured for combining said fiber wash water with process water from the ethanol plant to produce said fiber wash water for input to the ethanol plant.

9. A starch separation system for an ethanol plant, which system comprises: a dry fractionization system configured for receiving corn from the ethanol plant and fractionating the corn into components including corn oil, corn fiber, corn grits, corn, endosperm flour and germ cake; said ethanol plant configured for mixing said corn endosperm flour with water for conversion to sugar; said ethanol plant configured for feeding said corn grits to a hammer mill and combining with said corn endosperm flour for conversion to sugar; said ethanol plant configured for converting said sugar to ethanol; a fiber blender configured for combining said corn fiber and said germ cake with recycled beer bottoms from the ethanol plant, and an amylase enzyme from the ethanol plant and a fiber center to produce a blended fiber; a fiber slurry tank configured for receiving said blended fiber; a steam jet configured for receiving fiber slurry from the fiber slurry tank for mixing with steam to produce heated fiber slurry; a refiner configured for receiving said heated fiber slurry and exposing the heated fiber slurry to a high shear force for shredding fiber in the heated fiber slurry and exposing starch embedded in fiber components; said refiner configured for producing refined fiber; a fiber liquefaction tank configured for receiving said refined fiber and converting starch contained therein to water-soluble dextrins for producing a converted fiber stream; a fiber wash system configured for receiving said converted fiber stream and producing fiber wash water for input to the ethanol plant; said fiber wash system including fiber decanters configured for providing fiber centrate for combining with said fiber wash water; said fiber wash system configured for receiving a portion of the fiber centrate from the fiber decanters for combining with the fiber stream and process water to produce fiber wash water for input to the ethanol plant; said fiber decanters configured for producing fiber wet cake at approximately 35-40% wt solids for input to the ethanol plant for further processing; said fiber decanters configured for recycling said fiber centrate and sending portions to the fiber blender and the fiber wash system; said fiber wash system washes soluble sugar and small particle size protein off of the converted fiber stream for producing washed fiber and fiber wash water; said fiber wash water laden with sugar and protein; said starch separation system configured for recovering said sugar and protein for increased process efficiency; said fiber wash system including: multiple fiber wash filters; said starch separation system being configured for flowing said fiber wash water counter current of fiber passing through said fiber wash system; said starch separation system configured for combining said fiber wash water with process water from the ethanol plant to produce said fiber wash water for input to the ethanol plant; said fiber wash filter including a wash filter body comprising a pipe with sealed upper and lower ends; a fiber wash inlet; a process water inlet; and a fiber wash water outlet configured for providing fiber wash water to said ethanol plant; each said fiber wash filter including: a screen cylinder assembly comprising multiple screen cylinders installed as a bundle in said wash filter body; each said screen cylinder assembly including a cylindrical wedge wire screen comprising multiple wedge wires and including an outer surface; each said wedge wire having a flat side at said outer surface; and multiple wash pumps each configured for receiving a dewatered fiber stream from a respective wash filter, diluting same with process water, and transferring a diluted fiber stream to a respective wash filter.

10. The starch separation system of claim 9 wherein each said fiber wash filter includes: a tube sheet mounting said screen cylinder assembly and including multiple openings each receiving a screen cylinder welded at its upper and to said tube sheet around a respective opening; and said tube sheet having a wash filter body flange configured for mounting to said wash filter body.

11. A method of separating starch in an ethanol plant comprising the steps of: receiving corn from the ethanol plant in a dry fractionization system; fractionating the corn into components including corn oil, corn fiber, corn grits, corn, endosperm flour and germ cake; mixing said corn endosperm flour with water for conversion to sugar; feeding said corn grits to a hammermill; combining said corn grits with said corn endosperm flour for conversion to sugar; converting said sugar to ethanol; producing a blended fiber by combining said corn fiber and said germ cake with recycled beer bottoms from the ethanol plant in a fiber blender; blending in said fiber blender an amylase enzyme from the ethanol plant and a fiber centrate; receiving said blended fiber in a fiber slurry tank; receiving fiber slurry from said fiber slurry tank and steam-heating said fiber slurry with a steam jet; receiving said fiber slurry in a refiner; exposing said fiber slurry to a high shear force in a refiner; shredding the fiber and exposing starch embedded in the fiber components in said refiner and producing refined fiber; receiving said refined fiber in a fiber liquefaction tank and converting starch contained therein to water-soluble dextrins for producing a converted fiber stream; and receiving in a fiber wash system said converted fiber stream and producing fiber wash water for input to the ethanol plant; said fiber wash system including: multiple fiber wash filters; configuring said starch separation system for flowing said fiber wash water counter current of fiber passing through said fiber wash system; configuring said starch separation system for combining said fiber wash water with process water from the ethanol plant to produce said fiber wash water for input to the ethanol plant; said fiber wash filter including a wash filter body comprising a pipe with sealed upper and lower ends; a fiber wash inlet; a process water inlet; and a fiber wash water outlet configured for providing fiber wash water to said ethanol plant; each said fiber wash filter including: a screen cylinder assembly comprising multiple screen cylinders installed as a bundle in said wash filter body; each said screen cylinder assembly including a cylindrical wedge wire screen comprising multiple wedge wires and including an outer surface; each said wedge wire having a flat side at said outer surface; and providing multiple wash pumps each configured for receiving a dewatered fiber stream from a respective wash filter, diluting same with process water, and transferring a diluted fiber stream to a respective wash filter.

12. The method according to claim 11, which includes the additional steps of:
providing a fiber decanter in said fiber wash system;
combining said fiber centrate with said fiber wash water in said fiber decanter;
said fiber wash system receiving a portion of the fiber centrate from the fiber decanter and combining same with the fiber stream and process water to produce fiber wash water; and
providing said fiber wash water as input to the ethanol plant.

13. The method according to claim 12, which includes the additional steps of:
producing fiber wet cake at approximately 35-40% wt solids with said fiber decanters; and
providing said fiber wet cake as input to the ethanol plant for further processing.

14. The method of claim 13, which includes the additional step of: said fiber decanters recycling said fiber centrate and sending portions to the fiber blender and the fiber wash system.

15. The method of claim 14, which includes the additional step of: said fiber wash system washing soluble sugar and small particle size protein off of the converted fiber stream for producing washed fiber and fiber wash water.

16. A method of separating starch in an ethanol plant, which method includes the steps of: providing a dry fractionization system configured for receiving corn from the ethanol plant and fractionating the corn into components including corn oil, corn fiber, corn grits, corn, endosperm flour and germ cake; configuring said ethanol plant for mixing said corn endosperm flour with water for conversion to sugar; configuring said ethanol plant for feeding said corn grits to a hammer mill and combining with said corn endosperm flour for conversion to sugar; configuring said ethanol plant for converting said sugar to ethanol; providing a fiber blender configured for combining said corn fiber and said germ cake with recycled beer bottoms from the ethanol plant, and an amylase enzyme from the ethanol plant and a fiber center to produce a blended fiber; providing a fiber slurry tank configured for receiving said blended fiber; a steam jet configured for receiving fiber slurry from the fiber slurry tank for mixing with steam to produce heated fiber slurry; providing a refiner configured for receiving said heated fiber slurry and exposing the heated fiber slurry to a high shear force for shredding fiber in the heated fiber slurry and exposing starch embedded in fiber components; said refiner configured for producing refined fiber; providing a fiber liquefaction tank configured for receiving said refined fiber and converting starch contained therein to water-soluble dextrins for producing a converted fiber stream; providing a fiber wash system configured for receiving said converted fiber stream and producing fiber wash water for input to the ethanol plant; said fiber wash system including fiber decanters configured for providing fiber centrate for combining with said fiber wash water; said fiber wash system configured for receiving a portion of the fiber centrate from the fiber decanters for combining with the fiber stream and process water to produce fiber wash water for input to the ethanol plant; said fiber decanters configured for producing fiber wet cake at approximately 35-40% wt solids for input to the ethanol plant for further processing; said fiber decanters configured for recycling said fiber centrate and sending portions to the fiber blender and the fiber wash system; said fiber wash system washes soluble sugar and small particle size protein off of the converted fiber stream for producing washed fiber and fiber wash water; said fiber wash water laden with sugar and protein; said starch separation system configured for recovering said sugar and protein for increased process efficiency; said fiber wash system including: multiple fiber wash filters; configuring said starch separation system for flowing said fiber wash water counter current of fiber passing through said fiber wash system; configuring said starch separation system for combining said fiber wash water with process water from the ethanol plant to produce said fiber wash water for input to the ethanol plant; said fiber wash filter including a wash filter body comprising a pipe with sealed upper and lower ends; a fiber wash inlet; a process water inlet; and a fiber wash water outlet configured for providing fiber wash water to said ethanol plant; each said fiber wash filter including: a screen cylinder assembly comprising multiple screen cylinders installed as a bundle in said wash filter body; each said screen cylinder assembly including a cylindrical wedge wire screen comprising multiple wedge wires and including an outer surface; each said wedge wire having a flat side at said outer surface; and providing multiple wash pumps each configured for receiving a dewatered fiber stream from a respective wash filter, diluting same with process water, and transferring a diluted fiber stream to a respective wash filter.

\* \* \* \* \*